E. BARNES.
SPECTACLES.
APPLICATION FILED MAY 17, 1920.
1,387,753. Patented Aug. 16, 1921.
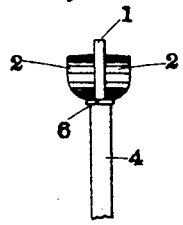 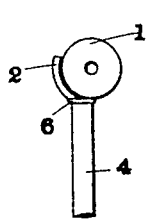 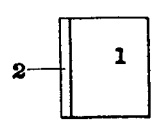 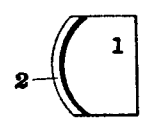
FIG. 1    FIG. 2    FIG. 4    FIG. 6
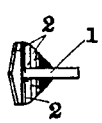 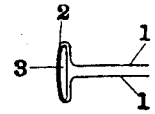 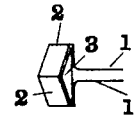
FIG. 3    FIG. 5    FIG. 7
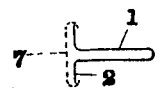
FIG. 9
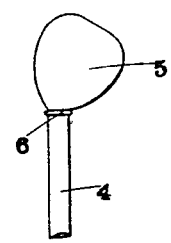 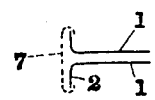 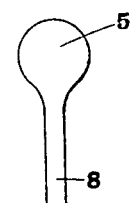
FIG. 8    FIG. 10    FIG. 11
Inventor.
Edwin Barnes,
By Watson, Coit, Morse & Grindle,
Attorneys.

UNITED STATES PATENT OFFICE.

EDWIN BARNES, OF SHEFFIELD, ENGLAND.

SPECTACLES.

1,387,753.   Specification of Letters Patent.   Patented Aug. 16, 1921.

Application filed May 17, 1920. Serial No. 382,029.

*To all whom it may concern:*

Be it known that I, EDWIN BARNES, a subject of the King of England, residing at Sheffield, in England, have invented certain new and useful Improvements in or Relating to Spectacles, of which the following is a specification.

This invention relates to spectacles, its object being to provide an improved method of manufacturing the hinged end of a spectacle side. The hinged end of each side or temple of a pair of spectacles comprises a circular disk with a flange on each side thereof curved about the center of the disk and extending partially around it; the disk is fitted to enter a corresponding recess in the joint of the eye wire where it is engaged by a pivot pin or screw passing through a central hole, the end of the flanges abutting against a part of the joint to form a stop limiting the opening of the side.

According to the present invention a flanged member of approximately T-section is formed from sheet metal, the side flanges thereof are curved about a common axis which intersects the plane of the central web and the member is secured by brazing or like operation to the end of the side. The flanges or the web of the flanged member or both may be reinforced by stiffening pieces inclosed in folds of the sheet metal or otherwise applied.

The end of the side is preferably flattened and inclosed in the web of the flanged member, so that the side end itself forms one of the stiffening pieces. If desired the side end, with or without being flattened may be curved and inclosed in or otherwise secured to the side flanges of the flanged member. In brazing the flanged member to the end of the side a ring fitting the side is preferably arranged at the junction of side and flanged member, to afford means for the more secure attachment of the flanged member to the spectacle side.

In the accompanying drawings:—

Figure 1 is an edge view and

Fig. 2 an elevation of the finished hinged end of a spectacle side according to the present invention.

Fig. 3 is a plan of Fig. 2.

Fig. 4 is an elevation of the flanged member.

Fig. 5 is a plan of Fig. 4.

Figs. 6 and 7 are views similar to Figs. 4 and 5 respectively showing the flanged member at a later stage of manufacture.

Fig. 8 is an elevation of the end of a spectacle side before the flanged member is secured in place.

Figs. 9 and 10 are views similar to Fig. 5 illustrating modifications.

Fig. 11 is an elevation of a detail employed in a modification.

Like reference numerals indicate like parts throughout the drawings.

In carrying out the present invention a flanged member of approximately T-section is first formed by suitably bending a blank of sheet metal. A convenient method of bending the blank is illustrated in Figs. 4 and 5, the central web 1 being formed from the two ends of the blank while the side flanges 2 comprise an intermediate portion of the blank, so that there is a double thickness of sheet metal throughout the member. A stiffening piece 3 may be and preferably is inclosed in the side flanges 2, a comparatively soft metal such as gold, silver or lead alloy being employed for the stiffening piece 3.

The flanged member having been formed by bending or folding the sheet metal, the side flanges 2 (with the stiffening piece 3 if used) are next curved, preferably by suitable press tools, about a common axis which intersects the plane of the central web 1, thus bringing the flanged member into the form shown in Figs. 6 and 7. In this operation the flanges 2 may also be somewhat tapered from the center as shown in Fig. 7.

The end of the spectacle side 4 is flattened by hammering or pressing to produce a plane enlargement 5 as shown in Fig. 8 of greater width but less thickness than the side 4. A ring 6 fitting the side 4 is placed thereon at the base of the enlargement 5 which latter is inclosed in the central web 1 of the flanged member, after which all contacting surfaces at the end of the spectacle side are secured together by brazing or like process. In order to bring the side flanges 2 across the end of the side, they and the contained stiffening piece may be slotted for the reception of the edge of the enlargement 5 before the parts are assembled and brazed together.

The final operations of stripping or cutting, piercing or boring, to bring the hinged end to the ultimate form illustrated in Figs.

1, 2 and 3 are preferably effected by suitable press tools.

If desired the central web 1 of the flanged member may be made from the central part of the sheet metal blank as illustrated in Fig. 9, the side flanges being comprised by the end parts of the blank with or without an additional piece of sheet metal folded over them as indicated in dotted lines at 7 to inclose or to provide the stiffening piece. Similarly, the flanged member may be made of two or more pieces of sheet metal as indicated in Fig. 10.

In another modification instead of working the side 4 to form the part 5 a separate piece may be used, pressed out of sheet metal and preferably having a tail-like portion 8 as shown in Fig. 11 for attachment to the end of the side.

In another modification the end of the side 4 may be flattened to a less extent than indicated in Fig. 8, curved to correspond with the side flanges 2 and inclosed in or secured by the brazing operation to such side flanges. In some cases the end of the side 4 may be inclosd in the side flanges without being flattened.

It will be understood that although it is preferred to inclose the end of the side between a double part of the flanged member these two parts may be arranged side by side and be secured by the brazing operation.

What I claim and desire to secure by Letters Patent is:—

1. A hinge for a spectacle side comprising a flanged sheet metal member of approximately T-section forming flanges and a central web; the flanges being curved about a common axis which intersects the plane of the central web, said member being rigidly secured to the end of the side.

2. A hinge for a spectacle side comprising a flanged sheet metal member of approximately T-section forming flanges and a central web; the flanges being reinforced by a stiffening piece, and curved about a common axis which intersects the plane of the central web, said member being brazed to the end of the side.

3. A hinge for a spectacle side comprising a flanged sheet metal member of approximately T-section forming flanges and a central web with double walls; the flanges being curved about a common axis which intersects the plane of the central web, said member being rigidly secured to the end of the side, the end of the side being inclosed between the walls of the flanged member.

4. A hinge for a spectacle side comprising a flanged sheet metal member of approximately T-section forming flanges and a central web with double walls; the flanges being curved about a common axis which intersects the plane of the central web; the end of the side being provided with a flattened end, and said flattened end of the side being inclosed and brazed between said walls of the web, of the flanged member.

5. A hinge for a spectacle side comprising a flanged sheet metal member of approximately T-section forming flanges and a central web, the flanges being curved about a common axis which intersects the plane of the central web and said member being brazed to the end of the side and a ring being provided surrounding the side at the junction of side and flanged member.

6. A hinge for a spectacle side comprising a flanged sheet metal member of approximatly T-section forming flanges and a central web; the flanges being reinforced by a stiffening piece, and curved about a common axis which intersects the plane of the central web, said member being brazed to the end of the side, a ring being provided surrounding the side at the junction of side and flanged member.

7. A hinge for a spectacle side comprising a flanged sheet metal member of approximately T-section with double walls forming flanges and a central web; the flanges being formed about a common axis which intersects the plane of the central web, said member being brazed to the end of the side, said end being inclosed between said double walls of the flanged member and a ring being provided surrounding the side at the junction of side and flanged member.

8. A hinge for a spectacle side comprising a flanged sheet metal member of approximately T-section with double walls, forming flanges and a central web; the flanges being curved about a common axis which intersects the plane of the central web, the side being provided with a flattened end, and said flattened end being inclosed between the walls in the web and rigidly secured thereto, a ring being provided surrounding the side at the junction of side and flanged member.

In testimony whereof I affix my signature.

EDWIN BARNES.

Witnessees:
ARTHUR H. GREENWOOD,
FLORENCE MAY.